United States Patent Office 3,338,694
Patented Aug. 29, 1967

3,338,694
MANUFACTURE CALCIUM ALUMINATE
OPTICAL GLASS
John R. Davy, 47 Ravelston Road, Bearsden, England
No Drawing. Filed Feb. 26, 1965, Ser. No. 435,694
16 Claims. (Cl. 65—32)

This application is a continuation-in-part of my application Ser. No. 8,885 filed Feb. 15, 1960 now abandoned.

This invention relates to optical glass and to the manufacture thereof and in particular relates to glasses of the calcium aluminate group.

Optical glasses of the calcium aluminate group transmitting all or part of the electro-magnetic spectrum between the limits of roughly 2000 A. and 100,000 A. (10 microns) have as their main glass forming constituents calcium oxide and aluminium oxide, and modifiers bonded together to form a homogeneous mass. In general, it is the function of some of the modifiers to act to lower the melting point of the mass during manufacture and thus ease the problems of founding and homogenising the glass, and to prevent the separation and crystallization of some or all of the main constitutents either during or after cooling. Variation of said modifiers may also effect variation of the optical and mechanical properties of the resulting glass.

It is a feature of the heat treatment of such glasses, both during founding and to some extent subsequently, that as the various constituents of each glass may possess different vapour pressure they may, therefore, suffer varying percentage losses by evaporation, vapour pressure being the pressure at which the molten material and its vapour are in equilibrium.

In glass founding as normally practised, an allowance for the unequal loss is made by adjusting the composition of the constitutent mixture. Once the glass has founded the difference in the vapour pressure of all the constituents becomes less important, mainly due to the fact that treatment is normally carried out at atmospheric pressure, viz. 14.5 lbs. per sq. inch or approximately 760 mm. of mercury, and this pressure prevents any rapid "boiling off" of the constituents at temperatures fairly close to, but above, the melting point of the mixture. Stable, homogeneous glasses of predictable composition and performance can therefore be achieved.

In the manufacture of some calcium aluminate glasses, however, it has been found necessary to carry out part of the post-founding treatment of the molten glass under reduced pressures considerably less than atmospheric, and in the region of, say, 1 mm. to 0.01 mm. of mercury. This treatment in vacuum may be required either because said new types of glasses have a melting point higher than can be readily achieved in the conventional gas or electric furnace operating in air, or because purification is necessary to remove certain impurities or unwanted constituents which, when present, adversely affect the optical or mechanical properties of the glass produced.

Said impurities may include water vapour, carbon dioxide, oxygen, nitrogen, sulphur dioxide, and compounds of alkali metals, for example, sodium oxide or potassium oxide, the main impurity being water vapour either as the complete molecule H—O—H dissolved in the glass, or as the radical —OH chemically bonded in the glass.

Since the majority of these harmful impurities have relatively high vapour pressures, melting in vacuum offers a neat, if not the only possible, method of cleansing the glass by "boiling off" the materials, that is to say, by raising the temperatures until the vapour pressures of the unwanted impurities becomes greater than the superincumbent pressure.

If attempts are made to vacuum-treat glasses in which the said modifiers are composed, as is usually the case, of alkali oxides, for example, sodium oxide or potassium oxide, it is found that coincident with the volatilisation of impurities there is a continual loss of modifiers by evaporation from the molten glass. This results in:

(a) Alteration in composition of the glass, leading first to modification of its physical and optical properties and finally to devitrification.

(b) The prolonged evolution of bubbles in the molten glass which remains either a frothy mass, or, at the best, contains so many bubbles that it is useless for optical purposes.

An object of the present invention is the production of a calcium aluminate glass involving purification under vacuum, with reduction or substantial elimination of evaporation losses of the glass-forming constituents and modifiers during purification.

A further object of the present invention is the production of a calcium aluminate glass which can be pressure moulded.

According to the present invention we provide, in a method of manufacturing optical glass by heating same in vacuo to evaporate any impurity therein; founding the glass from the constituents calcium oxide and aluminum oxide and at least one of the modifiers from the group silicon dioxide, magnesium oxide and barium oxide, and heating the glass in vacuo and in contact with an allotropic form of carbon to a pressure which is in the range between the highest vapour pressure of the glass-forming constituents and modifiers and the lowest vapour pressure of the impurities to be evaporated, whereby loss by evaporation of said constituents and modifiers is substantially eliminated.

Further, according to the present invention we provide, in a method of manufacturing optical glass by heating same in vacuo to evaporate water vapour impurity therein; founding the glass from the constituents calcium oxide and aluminium oxide and at least one of the modifiers from the group silicon dioxide, magnesium oxide and barium oxide, and heating the glass in vacuo and in contact with an allotropic form of carbon to a temperature within the range 1100° C. to 1750° C. and at a pressure within the range 0.01 micron to 200 microns so that the latter is higher than the highest vapour pressure of the glass-forming constituents and m o d i fi e r s and less than the vapour pressure of water, at the purification temperature selected, whereby loss by evaporation of said constituents and modifiers is substantially eliminated.

Preferably, the glass forming constituents and modifiers are combined in proportions which form a eutectic.

Still, further according to the present invention we provide an optical glass composed of the glass-forming constituents calcium oxide and aluminium oxide and at least one of the modifiers silicon dioxide, magnesium oxide, or barium oxide, the constituents and modifiers having a vapour pressure which is sufficiently low to permit the removal of impurities, especially water vapour, from the glass by heating in vacuo to a temperature, and at a pressure sufficient to effect release of impurities by evaporation without consequent evaporation of the glass-forming constituents and modifiers.

In one example of an optical glass according to the invention, the glass-forming constituents and modifiers are as follows:

*Example 1*

|  | Materials | Percentage by weight ±1 |
|---|---|---|
| Glass-forming constituent | Calcium Oxide | 47.3 |
| Do | Aluminium Oxide | 42.1 |
| Glass-forming modifier | Magnesium Oxide | 4.2 |
| Do | Silicon Dioxide | 6.4 |

The above materials, selected for purity, are carefully calcined and are then mixed in the above proportions to form a eutectic, due allowance being made for weight loss, for example, by conversion of carbonates to oxides when the former are used initially instead of oxides, and mixing being thorough. The mixture is compounded to form a stiff paste, using pure water, and is placed in a platinum crucible which is placed in any convenient furnace capable of attaining the founding temperature. In the case of the present eutectic, a gas-fired furnace operating at 1500° C. may be used, but an electric furnace may be used if desired, for other suitable glasses.

When founded, the glass is poured from the crucible on to a cooled slab where it breaks to form pieces of transparent raw glass or "cullet." The broken pieces of cullet are placed in a crucible which is placed in a suitable furnace in a vacuum tank. The furnace may be of the electric resistance heated type, using graphite rods, metal wires or tapes as the heating elements, or it may be a furnace in which the crucible is directly heated by high frequency current using an induction coil.

The pressure of the vacuum tank is reduced to less than 1.0 micron and the crucible and contents are heated in contact with an allotropic form of carbon, gently at first, but with increasing power input, provided always that release of gasses does not cause the pressure to rise to a value greater than 10.0 microns. The allotrope of carbon may be in any suitable form and is introduced into the melt either as a piece of carbon or graphite in the form of a disc, rod or plate, or the like, or as powdered carbon or graphite. Alternatively, the crucible may be made of graphite or be lined with graphite.

When the glass reaches the melting or phase-transformation point, which in the case of the present eutectic is at a temperature close to 1100° C., the rate of heating is slowed until bubbles cease to rise in the molten mass.

In some glasses the first release of gas is followed by a re-solidification of the mass, which then remelts at a higher temperature. In such a case, the heating is resumed cautiously until the second melting point is reached, and again after evolution of gas has ceased. In the present example, this secondary melting point is close to 1300° C. The carbon is particularly beneficial in removing the water vapour impurity. The primary effect of the addition of carbon is to initiate a chemical relation of the type C+—OH=CO+H, whereby a hydroxyl group —OH chemically bonded to the glass is decomposed, the resultant gases being released and removed by the vacuum system.

The glass is then refined by raising the temperature to a value which experience dictates as being necessary and which in the present example is between 1650° C. and 1750° C.

The glass is then left to cool in the crucible, or is poured from the crucible into a suitable container. If left in the crucible, which may itself be of a shape suitable for the final purpose for which the glass is required, the crucible may be removed from the furnace, or the insulation of the furnace may be slid away from the crucible, in order to increase the rate of cooling, and so minimize risk of devitrification. If the glass is poured, the mix may be pressure moulded and the resulting glass has no signs of devitrification.

The total time required for the vacuum melting operation varies with the size of batch and the speed of the furnace, but a typical schedule for 400 gm. of the present eutectic is as follows:

|  | Minutes |
|---|---|
| Pump down to 1 micron or less | 10 |
| Raise temperature to primary melting point | 10 |
| Hold at temperature and degass | 5 |
| Raise temperature to secondary melting point | 10 |
| Degass at this temperature | 12 |
| Raise temperature to 1720° C. | 15 |
| Lower to 1600° C. | 10 |

Pour or cool in crucible.

The use of a eutectic is preferred and pressure moulding is used with the eutectic as, while the mixture has the lowest possible constant melting point, it also has the least tendency to devitrification due to separation of one or more of its constituents or modifiers. However, eutectics may be varied within the following general rules, and be pressure moulded. Thus, glasses may be used in which the ratio of calcium carbonate to aluminium oxide may lie between the limits 1:1 and 1:3, the percentage silica may be from 6% to 8%, and the percentage magnesium oxide may be between 4% and 7%. Alternatively, the ratio of calcium carbonate to aluminum oxide may be between 1:1 and 1:4, the percentage barium carbonate may be 5% to 10%, and the percentage of magnesium oxide may be between 1% and 10% of the combined total of the other three constituents.

In the pressure moulding process, the molten glass is poured into one half of the mould and the other half is immediately pressed on the glass, and thin moulds of glass, for example 0.125 inch thick, can be formed in this way. The moulds are preferably made of graphite, or have a graphite lining, which can be polished to produce a smooth glass surface.

Modifiers other than those given in Example I may be used such as, for example, silicon dioxide, and barium oxide. While the use of a eutectic is in general preferred, it is not essential, as long as the constituents used have vapour pressures which, at the temperature necessary for removal of impurities by evaporation in vacuo, are less than that of the vacuum and those of the impurities. In this case the vapour pressures of the glass-forming constituents and modifiers are preferably as nearly equal as possible.

It is to be understood that the purification temperatures and degree of vacuum pressure may vary in accordance with the glass-forming constituents and modifiers used for the glass. For example, while the vacuum pressure is preferably less than 20 microns it may be at any other point between approximately 0.01 micron and 200 microns as long as it is in the range between the highest vapour pressure of the glass-forming constituents and modifiers and the lowest vapour pressure of those of the impurities therein, at the purification temperatures.

Further examples of glass-forming constituents and modifiers and the degree of vacuum required according to the invention are as follows:

*Example II*

|  | Materials | Percentage by weight ±1 | Vacuum |
|---|---|---|---|
| Glass-forming constituent | Calcium Oxide | 30 | Less than 200 micron. |
| Do | Aluminium Oxide | 39 |  |
| Glass-forming modifier | Silicon dioxide | 31 |  |

*Example III*

|  | Materials | Percentage by weight ±1 | Vacuum |
|---|---|---|---|
| Glass-forming constituent | Calcium Oxide | 36.4 | Less than 200 micron. |
| Do | Aluminium Oxide | 45.4 |  |
| Glass-forming modifier | Barium Oxide | 13.5 |  |
| Do | Magnesium Oxide | 4.7 |  |

The method of treating the above constituents and modifiers is the same or similar to that described with reference to Example I.

Carbonates may be used instead of oxides, for example calcium carbonate instead of calcium oxide, and in this case the carbonates before being introduced into the mixture are dried instead of being calcined.

While certain materials in the examples are indicated as being glass-forming constituents and others are indicated as being modifiers, the percentage of the latter may be increased until it becomes a glass-forming constituent.

The invention is applicable to the removal of, for example, only one impurity as well as to the removal of all impurities.

As a result of the present invention, glasses of the calcium aluminate group can be purified substantially without loss by evaporation of constituents or modifiers, the use of carbon in contact with the glass accelerates to a remarkable degree the removal of water vapour, and it is now possible to pressure mould such glasses.

The quantity of carbon or graphite employed may vary, and the following quantities are given by way of example:

(a) About one gram of powdered graphite or carbon per kilogram of glass, when about two or more kilograms of glass are being processed in a graphite crucible.

(b) When less than about two kilograms of glass are being processed in a graphite crucible, no additional graphite or carbon need be introduced into the melt.

(c) About two grams of powdered graphite or carbon per kilogram of glass, when the latter is being processed in a crucible not made of or lined with graphite, for example a platinum crucible.

(d) When the carbon or graphite is introduced into the melt in the piece, it should have about 10 sq. cms. of surface area per kilogram of glass.

The powdered carbon or graphite is intimately mixed with the cullet prior to the step of heating in vacuum. An excess of carbon or graphite is not harmful, as such excess floats on the surface of the melt and can be trapped or otherwise disposed of during pouring.

I claim:

1. A method of manufacturing calcium aluminate optical glass to remove water vapor so that it transmits in the electro spectrum between 2,000 A. and 100,000 A., said method comprising founding the glass with about 30% to 47.3% calcium oxide, about 39% to 45.5% aluminium oxide and a balance of at least one of the modifiers selected from the group consisting of silicon dioxide, magnesium oxide and barium oxide and containing water vapor impurity, heating the glass in contact with an allotropic form of carbon to a temperature in the approximate range 1100° C. to 1750° C. in a vacuum of which the pressure is selected from the approximate range of 0.01 micron to 200 microns, said pressure being the range between the highest vapor pressure of the glass-forming constituents and modifiers, and the vapor pressure of the water impurity, and reacting said allotropic form of carbon with said water vapor to remove at least a portion of said water vapor from said glass.

2. The product produced in accordance with the method of claim 1.

3. The process of claim 1, wherein the pressure is maintained at a value not greater than 10 microns.

4. The method of claim 1, wherein the carbon reacts with the water in accordance with the formula $$C+H_2O=CO+H_2$$

5. The method claimed in claim 1, in which the glass-forming constituents are combined in proportions which form a eutectic.

6. The method claimed in claim 1, in which the modifiers are magnesium oxide and silicon dioxide and the respective percentages of the glass, by weight, are approximately; calcium oxide 47.3, aluminium oxide 42.1, magnesium oxide 4.2, silicon dioxide 6.4, the heating temperature is 1720° C. and the vacuum pressure is less than 1.0 micron.

7. The method claimed in claim 1, in which the modifier is silicon dioxide and the respective percentages of the glass, by weight, are approximately; calcium oxide 30, aluminium oxide 39, silicon dioxide 31, the heating temperature is 1720° C. and the pressure is less than 1.0 micron.

8. The method claimed in claim 1, in which the modifiers are barium oxide and magnesium oxide and the respective percentages of the glass, by weight, are approximately; calcium oxide 36.4, aluminium oxide 45.4, barium oxide 13.5, magnesium oxide 4.7, the heating temperature is approximately 1720° C. and the vacuum pressure is less than 1.0 micron.

9. The method claimed in claim 1, in which the molten glass is placed in contact with an allotropic form of carbon by introducing a piece of carbon or graphite into the molten glass.

10. The method claimed in claim 1, in which the molten glass is placed in contact with an allotropic form of carbon by introducing powdered carbon or graphite into the molten glass.

11. The method claimed in claim 1, in which the molten glass is placed in contact with an allotropic form of carbon by carrying out said heating in a graphite crucible.

12. The method claimed in claim 1, in which the constituents are calcium carbonate and aluminium oxide in the ratio between 1:1 and 1:3, about 6% to 8% silicon dioxide, and about 4% to 7% magnesium oxide.

13. The method claimed in claim 1, in which the constituents are calcium carbonate and aluminium oxide in the ratio between 1:1 and 1:3, about 5% to 10% barium carbonate, and about 1% to 10% of the combined total of the three said constituents is magnesium oxide.

14. The method claimed in claim 9, in which the size of the piece of carbon or graphite is such that it has 10 sq. cms. of surface area per kilogram of glass.

15. The method claimed in claim 11, in which there is at least two kilograms of glass and there is added one gram of powdered carbon or graphite per kilogram of glass.

16. The method claimed in claim 10, in which the glass is contained in a platinum crucible and there are two grams of carbon or graphite per kilogram of glass.

References Cited

UNITED STATES PATENTS

| | | | |
|---|---|---|---|
| 1,549,597 | 8/1925 | Miller | 65—66 |
| 2,877,280 | 3/1959 | Eden | 65—139 |

FOREIGN PATENTS

| | | |
|---|---|---|
| 551,029 | 9/1956 | Belgium. |
| 496,508 | 12/1938 | Great Britain. |

DONNALL H. SYLVESTER, *Primary Examiner.*

F. W. MIGA, D. CRUPAIN, *Assistant Examiners.*